(12) United States Patent
Tsimhoni et al.

(10) Patent No.: US 8,744,691 B2
(45) Date of Patent: Jun. 3, 2014

(54) ADAPTIVE HUMAN-MACHINE SYSTEM AND METHOD

(75) Inventors: Omer Tsimhoni, Herzliya (IL); Claudia V. Goldman-Shenhar, Mevasseret Zion (IL); Mario Jodorkovsky, Nesher (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/448,089

(22) Filed: Apr. 16, 2012

(65) Prior Publication Data

US 2013/0275004 A1 Oct. 17, 2013

(51) Int. Cl.
*B60R 22/00* (2006.01)

(52) U.S. Cl.
USPC .............................................. 701/45; 701/51

(58) Field of Classification Search
USPC ............................................................ 701/45
See application file for complete search history.

(56) References Cited

U.S. PATENT DOCUMENTS

| | | | | |
|---|---|---|---|---|
| 5,860,593 A | * | 1/1999 | Heinle et al. | 236/91 C |
| 5,878,809 A | * | 3/1999 | Heinle | 165/203 |
| 5,944,256 A | * | 8/1999 | Arai et al. | 236/49.3 |
| 6,454,178 B1 | * | 9/2002 | Fusco et al. | 236/49.3 |
| 6,616,057 B1 | * | 9/2003 | Kelly et al. | 236/49.3 |
| 6,644,558 B2 | * | 11/2003 | Ohga et al. | 236/49.3 |
| 2010/0023992 A1 | * | 1/2010 | Fryer et al. | 725/131 |

* cited by examiner

*Primary Examiner* — Hussein Elchanti

(74) *Attorney, Agent, or Firm* — Mark S. Cohen; Pearl Cohen Zedek Latzer Baratz LLP

(57) ABSTRACT

An adaptive, human-machine-interaction, system and method for executing system-actions at times in accordance with performance times of past user-actions to either accommodate user habits or to modify user behavior.

7 Claims, 5 Drawing Sheets

ADAPTIVE HUMAN-MACHINE SYSTEM AND METHOD

BACKGROUND OF THE PRESENT INVENTION

The present invention relates generally to a system for improving the quality of human-machine interaction by adapting execution times of machine-actions in accordance with performance time of user-actions. The machine-actions are executed by the adaptive system so as to improve system effectiveness by reducing user annoyance and to also modify user behavior so that the user complies with various safety and system requirements in an embodiment of the invention.

Such user-adaptive systems have application in the following activities, inter alia, fastening seat belts, removing ignition key from an ignition, and deactivating headlights lights, cabin lights, radio, and dimming headlights.

It should be appreciated that embodiments of the present invention have application in a wide variety of applications including, inter alia, vehicular devices like cars, trucks, airplanes, boats, and amusement rides.

BRIEF DESCRIPTION OF THE DRAWINGS

The subject matter regarded as the invention is particularly pointed out and distinctly claimed in the concluding portion of the specification. The invention, however, in regards to its components, features, method of operation, and advantages may best be understood by reference to the following detailed description and accompanying drawings in which:

Figure 1:
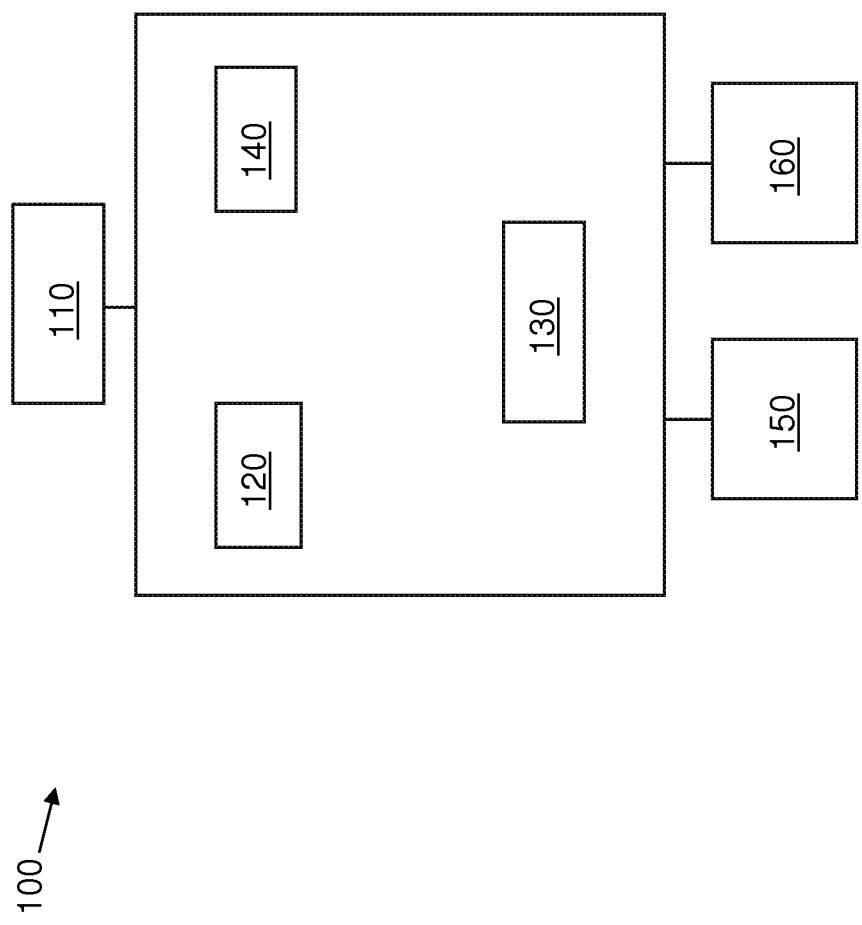
FIG. 1 is a schematic, block diagram of hardware employed in user-responsive notification systems, according to an embodiment of the present invention.

It should be appreciated that for the sake of simplicity and clarity of illustration, elements shown in the figures are not necessarily drawn to scale and reference numerals may be repeated in different figures to indicate corresponding or analogous elements.

DETAILED DESCRIPTION OF THE PRESENT INVENTION

In the following detailed description, numerous details are set forth in order to provide a thorough understanding of the invention. However, it will be understood by those skilled in the art that the present invention may be practiced without these specific details. Furthermore, well-known methods, procedures, and components have not been described in detail to avoid obscuring the present invention.

It should be appreciated that throughout this document, the issuance of a notification will be used as a non-limiting example of an execution time of an adaptive-system action.

Typically, the non-performance of expected actions within a pre-defined time event results in the issuance of an alert or notification. This time period is normally measured from a trigger event and is pre-set based on what is deemed to be typical user behavior, safety requirements, and engineering criteria.

Such timing schemes; however, are sometimes ineffective because they ignore varying user habits, preferences, and unique situations in which the pre-set parameters simply do not apply. In some cases, repeated, inappropriate reminders are not only annoying; but, habituate the user to ignore the notifications.

Embodiments of the invention learn user habits and deliver a notification or execute other types of system-actions at times reflecting these habits and does so in a manner encouraging users to comply with safety and operational requirements. This is accomplished, generally, by either delaying notifications to accommodate user delays or advancing the notification time to early times to persuade users to perform the expected user-action at an earlier time.

Such functionality has the potential to enhance user experience, reduce annoyance, and enhance safety.

The following terms will be used throughout this document:

"Trigger event" refers to an action from which timing activities are measured.

"System-action" refers to an action performed by the adaptive human-machine system in response to user interaction. These actions include issuing alerts, actuating, deactivating, or changing the configuration of accessory systems or devices. For the purposes of brevity, the "adaptive human-machine-system" is referred to as the "adaptive system or "system" throughout the document. Non-limiting examples of system-actions include, inter alia, modifying a setting of an in-vehicle infotainment system, activating a microphone, modifying a headlight setting, modifying a setting of a climate control system, modifying a wiper system, providing route guidance ascertained by a navigation system, issuing a reminder for a service action, and modifying a level of automation in an autonomous driving mode.

"Notification time" refers to time at which a notification begins to issue. Such times are typically measured from trigger events as noted above, however; it should be appreciated that any point in time prior to the notification act may be used as a reference time for timing system execution and user performance times.

"Performance time" refers to the time, relative to a trigger event or any other reference time, at which an expected action is performed by a user.

"Deviation time" is the difference between an execution time of a system-action and the performance time of a user-action. It should be appreciated that deviation times may be either positive or negative.

"Customized notification time" refers to an adjusted notification time reflecting user habits.

"Calendar-event" refers to a time of day, a day of the week, a date, or any other period of time measured in terms of a calendar. Such events may be used as factors for modifying execution times of system-actions.

"Infotainment systems" refer to information systems that deliver a combination of information and entertainment content to a driver or passengers in a vehicle. Non-limiting examples include, inter alia, radio and other in-vehicle information systems configured to deliver news, music, video, weather reports, traffic reports.

Turning now to the figures, FIG. 1 is a schematic diagram of a system for user-responsive notification system according to an embodiment of the present invention. User-responsive notification system 100 may include one or more computer vision sensors 10 (e.g., cameras, video camera, digital camera, or other image collection devices). Computer vision sensor 10 may capture an image that may include one or more objects and/or features. Images may also be input into system 100, for example, as downloads from other computers, databases or systems. Notification system 100 may include one or more processors or controllers 20, memory 30, long tem non-transitory storage 40, input devices 50, and output devices 60.

Non-limiting examples of input devices 50, inter alia, reed switch sensor, seat belt tension sensors, Hall-effect sensors, a touch screen, a capacitive or resistive input device, microphone, a button, a switch, galvanic sensor, or pressure sensor.

Non-limiting examples of output devices include a display screen, audio device such as speaker or headphones. Input devices 50 and output devices 60 may be combined into a single device.

Processor or controller 20 may be, for example, a central processing unit (CPU), a chip or any suitable computing device. Processor or controller 20 may include multiple processors, and may include general purpose processors and/or dedicated processors such as graphics processing chips. Processor 20 may execute code or instructions, for example stored in memory 30 or long term storage 40, to carry out embodiments of the present invention.

Memory 30 may be Random Access Memory (RAM), a read only memory (ROM), a Dynamic RAM (DRAM), a Synchronous DRAM (SD-RAM), a double data rate (DDR) memory chip, a flash memory, a volatile memory, a non-volatile memory, a cache memory, a buffer, a short term memory unit, a long term memory unit, or other suitable memory units or storage units. Memory 30 may be or may include multiple memory units.

Long term, non-transitory storage 40 may be or may include, for example, a hard disk drive, a floppy disk drive, a Compact Disk (CD) drive, a CD-Recordable (CD-R) drive, flash memory device. It should be appreciated that various combinations of the above storage devices are also included within the scope of the present invention and that image data, code and other relevant data structures are stored in the above noted memory and/or storage devices.

Figure 2:
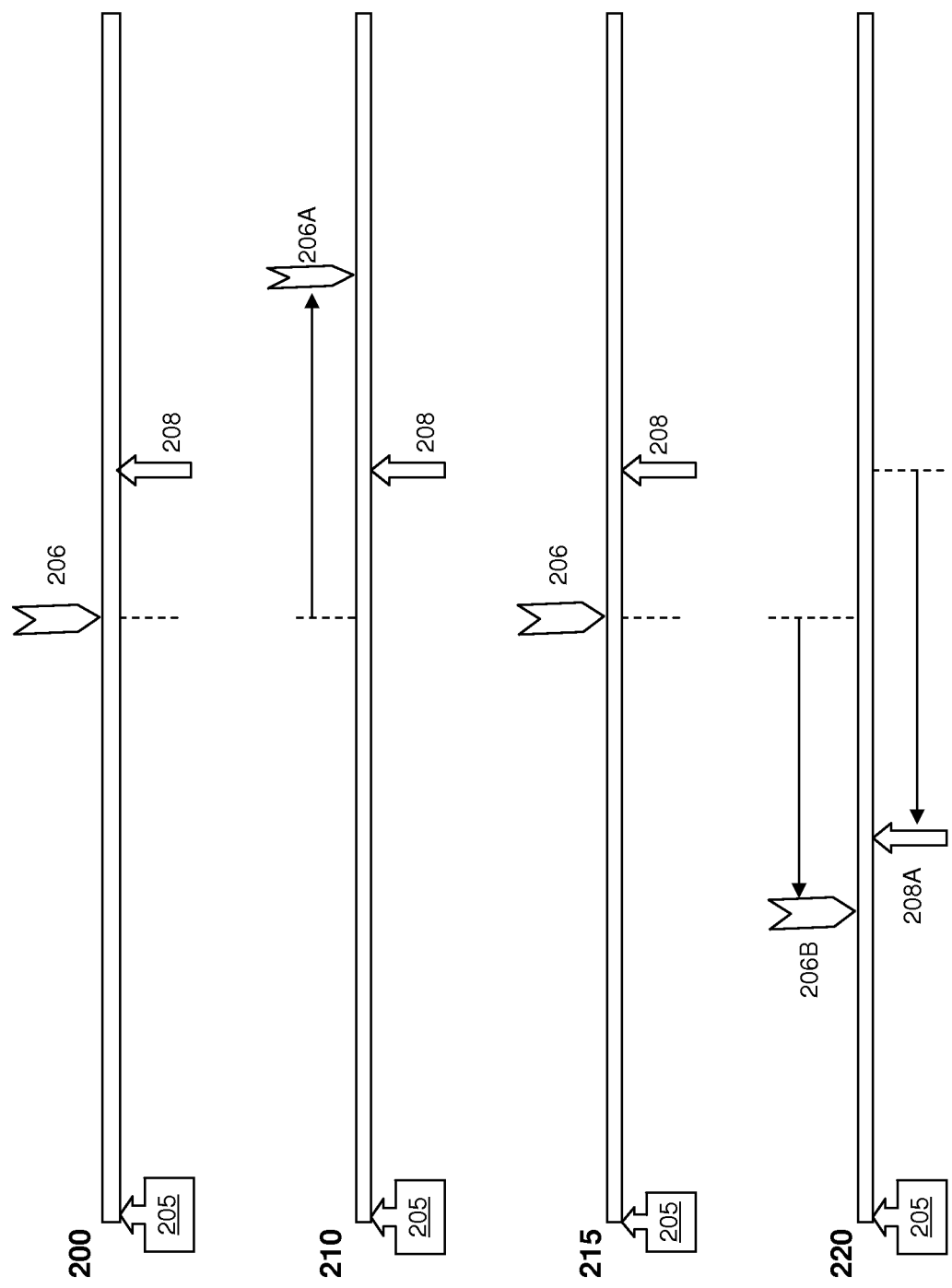
FIG. 2 depicts comparative timelines of key events during operation of the system of FIG. 1, according to an embodiment of the present invention.

FIG. 2 depicts four time-lines of three key events to which embodiments of the present invention relate; a trigger action 205, an system-action 206, and a user-action 208 in which the expected action is performed as shown in a default arrangement in timeline 200.

Following are non-limiting examples, inter alia, of trigger actions 205 and corresponding user-actions action 208:

Sitting in a seat or opening a door may be a trigger action for a user-action of fastening seatbelts.

Inserting a key into an ignition may be a trigger act for a user-action of starting a vehicle or disabling an alarm system.

Opening a door while sitting inside may be a trigger action for a user-action of turning off headlights or cabin lights, removing a key from the ignition, turning off the radio, or setting a handbrake.

Fueling a vehicle may be a trigger action for the next user-action of re-fueling a vehicle.

A maintenance operation may be a trigger action for the next, identical maintenance operation.

Dimming bright lights may be a trigger action for re-activating the bright lights.

Other user-actions include, inter alia, removing a key from an ignition, modifying a headlight setting, modifying a setting of an in-vehicle infotainment system, issuing a user expression recognizable by a dialogue system, changing a driving mode, modifying a setting of a climate control system, modifying a windshield wiper setting, and activating a turn signal. It should be appreciated that modifying a setting includes activating and deactivating a device.

Non-limiting examples of driving modes include, inter alia, efficiency modes directed at maximizing gas mileage or sport mode directed at maximizing vehicle responsiveness and an autonomous mode directed at minimizing driver assistance in driving.

Non-limiting examples of notification modalities include audio, visual or haptic feedback or a combination of any of them.

Embodiments of the present invention may be configured to operate either in an accommodation mode in which the system-action execution time is delayed until after a performance time of a user-action by a user as shown in timelines 200 and 210, or in a persuasion mode in which the system-action execution time is advanced to an earlier time as shown in timelines 215 and 220. This document will continue to discuss the issuance of notifications as a non-limiting example of the execution of system-action as noted above.

Turning now to the specific events of the timelines, timeline 200 depicts a default setting in which a notification 206 issues prior to the performance time of a user action 208 according to an embodiment of the invention. As noted above, both the execution and performance times are measured from a trigger action 205 in non-limiting embodiments.

In timeline 210, notification time 206A is delayed to a time subsequent to the performance time of user-action 208. As previously noted, such functionality reduces potentially annoying and unneeded notifications.

In non-limiting embodiments, for example, changes in times at which notifications issue, may be based on an average performance time of the ten most recent user-actions of a particular action type. It should be appreciated; however, that various schemes for arriving at an average performance time are included within the scope of the invention.

It should be further appreciated that non-limiting embodiments of the present invention include provisions for defining the variation between performance times of respective user-actions deemed as a different performance time.

Timeline 215 is the default condition depicted in timeline 200 in which a notification 206 issues prior to a user action 208.

In timeline 220, notification time 206B is advanced to persuade a user to modify his behavior by performing user action 208A earlier.

In addition to using time differentials execution times system-actions and performance times of user-actions, embodiments of the present invention may also use a variety of additional factors to identify a need to change execution times or to calculate new execution times of system-actions as will be further discussed.

Figure 3:
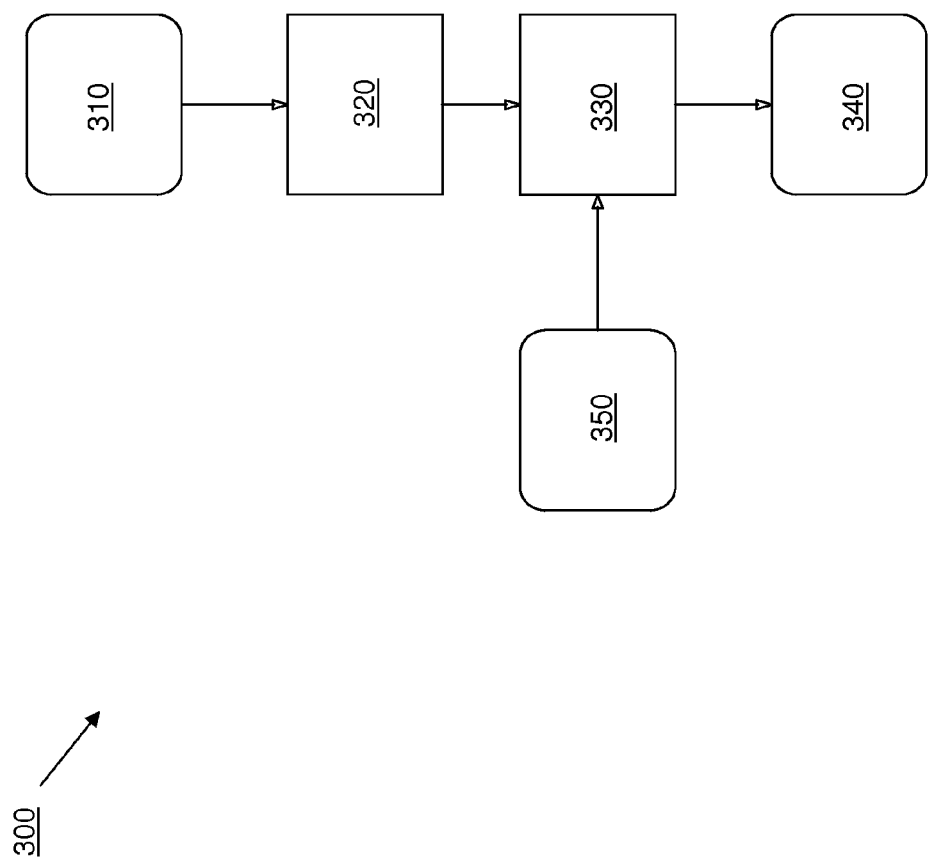
FIG. 3 is a flow chart depicting the primary steps of a process employed to calculate incremental time differences used to modify execution time of system-actions, according to an embodiment of the present invention.

FIG. 3 is a flow chart depicting a process for determining time increments to be added to performance times of user-actions or subtracted from execution times of system-actions according to embodiments of the present invention.

In general terms, the increments sizes are primarily a function of the time difference between an issue time of a notification and a performance time of the expected user-action according to embodiments of the invention. When operating in an accommodation mode, these time increments are added to the performance time of the user-action, whereas when operating in a persuasion mode these increments are subtracted from the execution time at which a notification issues as noted above.

Turning now to the flowchart, generally designated 300, in step 310 timing begins from a detected trigger event in an embodiment of the invention. In step 320, a time deviation between the issuance of a system notification and performance time of the expected user action is calculated. In step 330, a time increment is determined based on the current deviation time together with other deviation times from past usages according to an embodiment of the invention and an average deviation time is calculated according to embodiments. Some non-limiting embodiments use deviation times from the last ten user-actions; however, it should be appreciated that any number of deviation times may be used, as noted above.

In addition to the above-described deviation time between execution times of system actions and performance times of user-actions, additional forms of user input include, inter alia, explicit verbal instructions or expressions of discontent like sighs, or curses. Captured image data of facial expressions or hand gestures may also be used when recognized by object recognition algorithms are applied to captured image data. Furthermore, pressure or galvanic data obtained from galvanic or pressure sensors embedded in a vehicular accessory in physical contact with a user may also serve as input data, according to an embodiment of the invention.

The above noted types of user input may be used to trigger modification of execution times for system-actions or treated as parameters for determining the length of time increments, according to an embodiment of the present invention.

In step 350, contextual parameters are integrated into the method 300 so that the notification is user-adaptive in accordance to a particular situation detected by a location sensor. As a non-limiting example, a location identified as "home", a user would be allowed sixty seconds to fasten a seat belt prior to issuing a notification whereas at a location identified as "work" a user would be given thirty seconds to fasten the seat belt prior to issuing a notification. It should be appreciated that other contextual or situational settings, inter alia, include, times of the day, dates, days of the week, humidity and temperature, vehicle ownership, and the number of passengers traveling in a vehicle may be modeled into method 300 according to embodiments of the present invention.

Such location sensors may be implemented by way of image or audio recognition systems or Global Positioning System (GPS), or any location identification system.

In step 340, the new increment is either added to the performance time of a user-action or subtracted from the execution time at which one or more previous notifications issued, according to an embodiment of the present invention.

Figure 4:
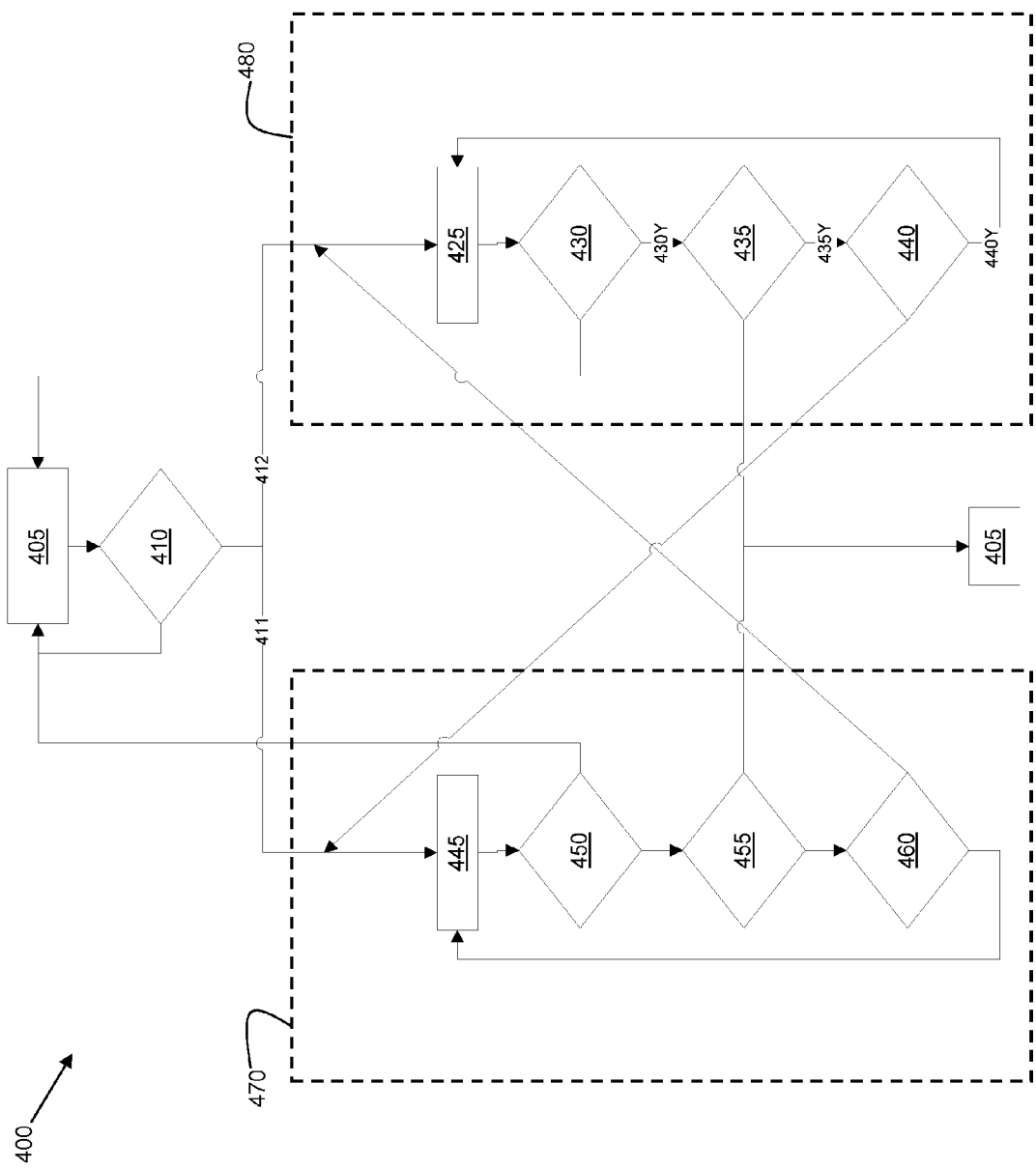
FIG. 4 is a flow chart depicting the primary steps of the process employed to modify execution time of system-actions to either accommodate user behavior or to modify user behavior, according to an embodiment of the present invention.

FIG. 4 is non-limiting example of a method, generally designated 400, to adjust a notification time, or the execution time of other system actions, to either accommodate user habits, to persuade change user habits, or to both accommodate and to persuade according to embodiments of the present invention. As shown, the flow chart 400 is divided into two branches, each one to implement one of these functionalities; accommodation branch 470 delays notification time whereas persuasion branch 480 advances notification time.

Turning now to flow chart 400, in step 405, a system monitors user activity for a trigger action. Upon detection of a trigger action, in step 410 a system determines whether to change the notification time based on the relative timing of the previous notification and user-action. Situations in which the user-action preceded the notification, the system reverts to a monitor mode in step 405.

Situations in which a notification precedes the user-action, processing proceeds to either the accommodation sequence 470 or the persuasion sequence 480 depending on mode index (not shown) indicating a tendency to function in an accommodate mode in an embodiment. When the mode index falls below a predefined threshold, processing continues in accommodation mode 470, otherwise, processing continues in the persuasion mode 480.

Processing within accommodation sequence 470 continues at step 445, in which the notification time is delayed by adding a time increment to the previous performance time of the user action; the time increment is calculated according to the process described in FIG. 3.

In step 450, the performance time of the current user-action is compared to the timing of the present adjusted notification time. If the current user-action precedes the presently adjusted notification time, the desired accommodation is deemed to have been accomplished and the system reverts to the monitor mode of step 405.

If the present execution time of the system-notification continues to precede the user-action, embodiments of the system evaluate if there is an option of further delaying notification in view of safety and operational limitations. If the notification has been delayed to the maximum amount, embodiments of the system revert to the monitor mode depicted in step 405.

However, if there remains an option of further delaying the notification time while still conforming to maximum delay limitations, the system then evaluates in step 460 whether a maximum number of iterations has been performed. If a predefined maximum number of iterations has not yet been performed, embodiments of the system continue to further delay notification time by transferring processing to step 445. If, on the other hand, the system determines that the system has achieved the maximum number of iterations and the user-action is still performed after the notification time, the user is deemed to be in need of behavior modification and the system continues processing in persuasion branch 480.

Turning now to persuasion mode 480, in step 425, embodiments of the system may adjust the time at which the notification issues by subtracting a time increment as calculated in the process depicted in FIG. 3. It should be noted that the time increment subtracted from the notification time during persuasion may differ from the time increment added to performance times of use-actions during accommodation.

In step 430, a decision is again made regarding the timing of the notification and user-action. When a user-action precedes a notification action, the desired persuasion is deemed to have been accomplished and the system reverts to monitor mode at step 405. However, when the notification time precedes the performance time, the system proceeds to evaluate if the notification time is compliant with a minimal notification time based on operational or safety limitations as shown in step 435. If the notification time has been advanced to the earliest allowable time, the system reverts to a monitor mode as shown in step 405.

Situations in which the notification time has not been advanced to the earliest allowable time the system proceeds to step 440 and evaluates if the maximum number of iterations has been achieved. If there are additional iterations available, embodiments of the system revert to step 425 to further adjust the notification time to an earlier time by subtracting a time increment from the notification time as described previously.

Situations in which a pre-defined allowable number of iterations has been exhausted and user notification continue to issue prior to the performance of user-actions, processing continues in the accommodation branch 470.

In this manner, embodiments of the present invention processing may vacillate between an accommodation mode and a persuasion mode.

Figure 5:
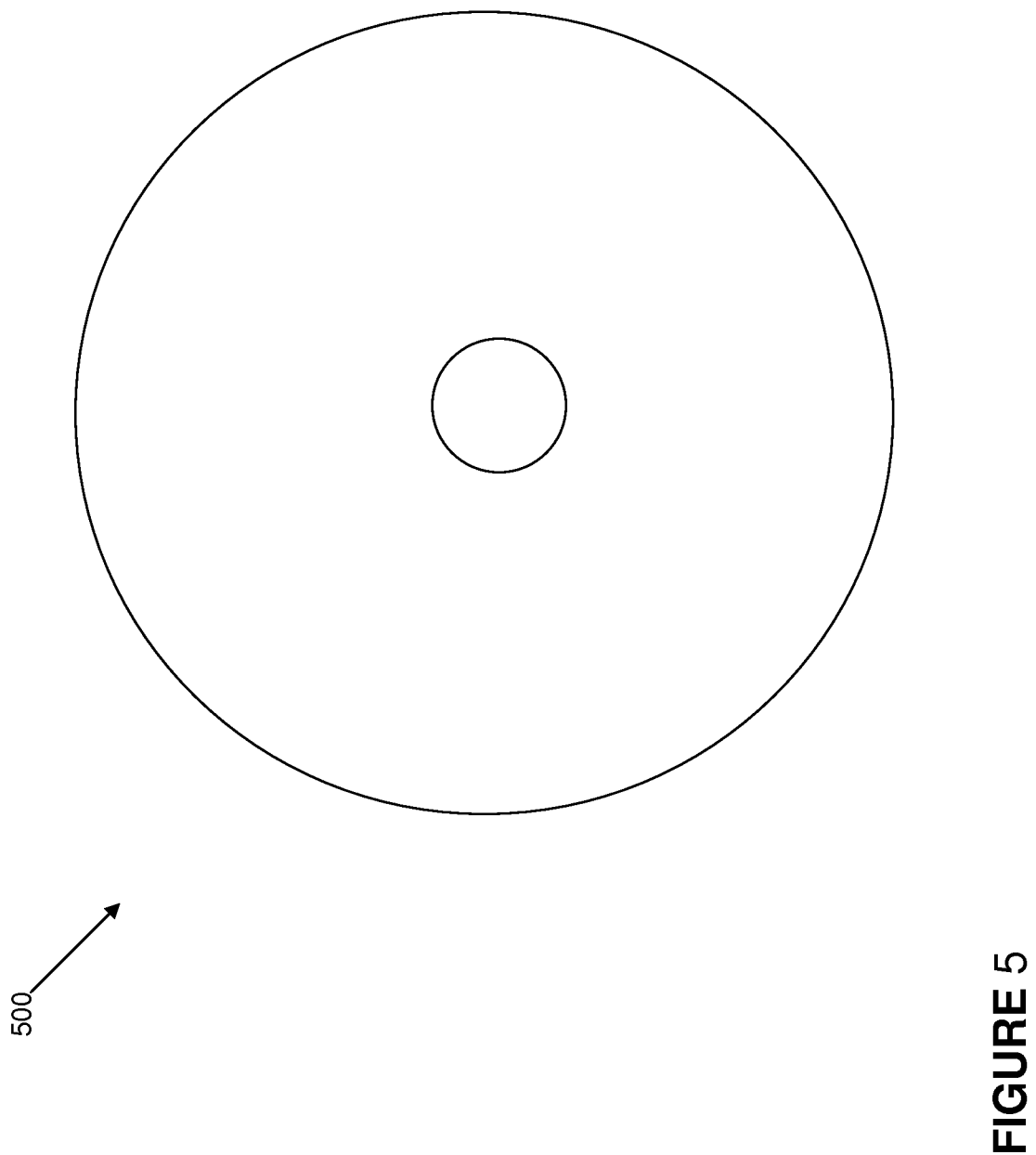
FIG. 5 depicts a non-transitory, computer-readable medium having stored thereon instructions for user-adaptive-system, according to an embodiment of the present invention.

FIG. 5 depicts a non-limiting, computer-readable media containing executable code for configuring a computer system to execute the above described, adaptive-system according to embodiments of the present invention.

Embodiments of the present invention may display parameters associated with the customization of time notification for training purposes or to provide process transparency. Such functionality may be implemented on existing dash displays, on dedicated displays, audio or haptic feedback systems.

Furthermore, embodiments of the present invention may include an onboard driver identification module for identifying each user and loading his particular user profile into the system. Embodiments in which the user profile is stored remotely and loaded into upon identifying oneself are also included within the scope of the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for adapting human-machine interaction, the method comprising:
   providing a processor-enabled, adaptive-system configured to execute a system-action at an execution time at least partially determined by performance times of at least one prior user-action; and
   measuring a time at which a user-action is performed; and
   changing an execution time of a system-action in accordance with the time at which the user-action is performed, wherein the system-action is selected from the group consisting of modifying a setting of an in-vehicle infotainment system, activating a microphone, modifying a headlight setting, modifying a setting of a climate control system, modifying a wiper system, providing route guidance ascertained by a navigation system, issuing a reminder for a service action, and modifying a level of automation in an autonomous driving mode.

2. A method for adapting human-machine interaction, the method comprising:
   providing a processor-enabled, adaptive-system configured to execute a system-action at an execution time at least partially determined by performance times of at least one prior user-action; and
   measuring a time at which a user-action is performed; and
   changing an execution time of a system-action in accordance with the time at which the user-action is performed, wherein the user-action is selected from a group consisting of fastening a seat belt, starting a vehicle, removing a key from an ignition, modifying a headlight setting, modifying a setting of an in-vehicle infotainment system, issuing a user expression recognizable by a dialogue system, changing a driving mode, modifying a setting of a climate control system, modifying a windshield wiper setting, and activating a turn signal.

3. A method for adapting human-machine interaction, the method comprising:
   providing a processor-enabled, adaptive-system configured to execute a system-action at an execution time at least partially determined by performance times of at least one prior user-action; and
   measuring a time at which a user-action is performed; and
   changing an execution time of a system-action in accordance with the time at which the user-action is performed, wherein the changing an execution time of the system-action is implemented in accordance with factors selected from a group consisting of location, calendar-events, weather characteristics, vehicular ownership, quantity of passengers, and facial expression.

4. An adaptive, human-machine-interaction system, the system comprising:
   a processor configured to:
      measure a time at which a user-action is performed;
      change an execution time of a system-action in accordance with the time at which the user-action is performed,
   wherein the system-action is selected from a group consisting of activating a radio, deactivating a radio, dimming headlights, and activating high-beams, activating a cabin light, deactivating a cabin light.

5. An adaptive, human-machine-interaction system, the system comprising:
   a processor configured to:
      measure a time at which a user-action is performed;
      change an execution time of a system-action in accordance with the time at which the user-action is performed,
   wherein the execution time of the system-action or the performance time of the user-action is measured from a trigger event, the trigger event selected from the group consisting of sitting in a seat, fastening a seat belt, inserting a key in an ignition, starting a vehicle, removing a key from an ignition.

6. An adaptive, human-machine-interaction system, the system comprising:
   a processor configured to:
      measure a time at which a user-action is performed;
      change an execution time of a system-action in accordance with the time at which the user-action is performed, wherein the processor is further configured to execute a system-action at an execution time reflecting a factor chosen from the group consisting of location, calendar event, weather, ownership of a vehicle, quantity of passengers, and facial expression.

7. A non-transitory computer-readable medium having stored thereon instructions for executing a system-action at a time at least partially determined by performance times of at least one prior user-action, which when executed by a processor, causes the processor to perform the method comprising;
   measuring a time at which a user-action is performed;
   changing an execution time of a system-action in accordance with the time at which the user-action is performed, wherein the execution time of the system-action is measured from a trigger event, the trigger event selected from a group consisting of fastening a seat belt, starting a vehicle, removing a key from an ignition, dimming head lights, deactivating head lights, deactivating cabin lights, and deactivating a radio.

* * * * *